Dec. 22, 1931. J. W. GALLOWAY 1,837,213
REMOVABLE ADJUSTABLE CONTROLLER FOR HUMIDIFIER VALVES
Filed April 18, 1930
Fig. 1.
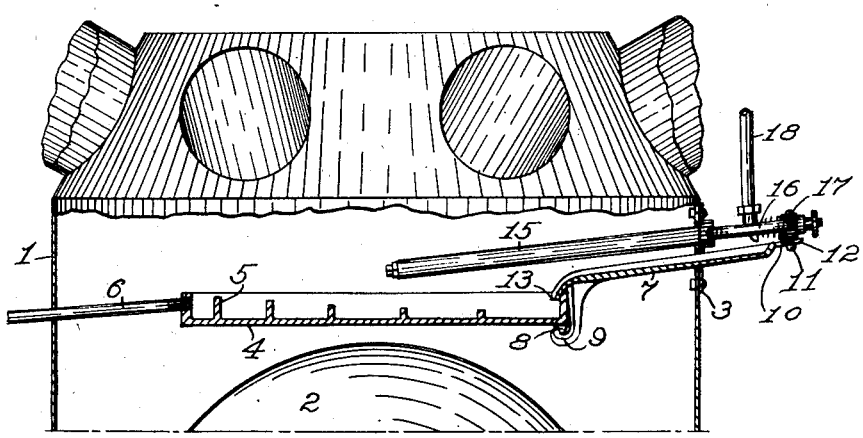
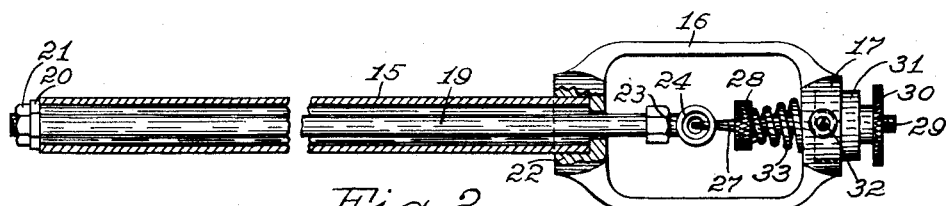
Fig. 2.
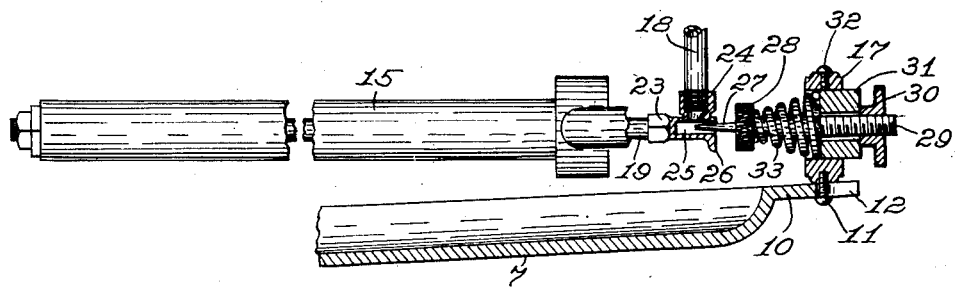
Fig. 3.
INVENTOR
James W. Galloway,
BY
ATTORNEY Patented Dec. 22, 1931

1,837,213

UNITED STATES PATENT OFFICE

JAMES W. GALLOWAY, OF CEDAR FALLS, IOWA, ASSIGNOR TO AUTOMATIC HUMIDIFIER COMPANY, OF CEDAR FALLS, IOWA

REMOVABLE ADJUSTABLE CONTROLLER FOR HUMIDIFIER VALVES

Application filed April 18, 1930. Serial No. 445,346.

My invention relates to improvements in humidifiers, and the object of my improvement is to supply for conjoint use in a humidifier assemblage for hot-air furnaces, a thermostat controller for water or other liquid to be delivered to an evaporating pan of the device, which shall be conveniently assembled with or separated from the device in various relations thereto.

This object I have accomplished by the means which are hereinafter described and claimed, and which are illustrated in the accompanying drawings, in which Fig. 1 is a view, partly in elevation and partly broken away, fragmentally, of the upper part of a hot-air furnace, showing my improved humidifier including said thermostat mounted therein and thereon, parts of the device being shown in longitudinal medial section, Fig. 2 is an enlarged detail plan view of the thermostat, with parts thereof in medial longitudinal section, and Fig. 3 is a view of said thermostat in side elevation with parts sectioned, showing its separable means of connection to the supply conduit of the evaporating pan.

The numeral 1 denotes the outer casing of a hot-air furnace, containing the usual fire-box crown 2. Just above said crown, an evaporating open top elongated pan 4 is supported centrally, diametrically and horizontally, and has at its remote end a communication through its end wall with an overflow pipe 6 which traverses said casing to deliver without it. The opposite end of said pan is supported by an inclined upwardly troughed hanger body 7. A face-plate 3 is fastened upon the outer wall of said casing, and it, as also the casing wall, are apertured at two places above and below, the lower aperture being traversed by said hanger body 7, the outer end of the latter being flattened terminally at 10 and provided with an end groove 12. The hanger body also serves as a conduit for water or other liquid received from a supply-pipe 18 without the furnace, the remote end part 13 being narrowed into a lip curved downwardly, resting on the abutting end wall of the pan 4 to deliver into the nearest of a series of alined compartments therein between transverse partitions 5 of different heights.

The hanger-body 7 has an integral depending hook 9 which detachably engages over a transverse rib 8 on the bottom of the pan 4 at its right-hand end. As thus assembled the conjoint weights of the hanger-body 7 and the pan 4 cause the engaged parts of both at said hook 9 to sag enough to firmly interlock the hanger-body there to the end of said pan, with the hanger-body in an inwardly inclined position.

The upper aperture in the face-plate 3 is traversed by the right-hand end part of the thermostat outer cylinder 15, the latter projecting into the interior of the casing 1 over the hanger-body 7 and partially over the pan 4 longitudinally. The numeral 16 denotes an open loop or yoke having the end sleeves 17 and 22, the latter having a socket to receive the abutted end of the cylinder 15, and being also centrally apertured to receive therethrough a central rod 19 whose remote end is threaded and secured to the remote end of the cylinder by a nut 20 and a lock-nut 21. The other sleeve 17 is also centrally apertured (see Fig. 3) to seat adjustingly therein a centrally apertured bushing body 31 in which is seated a terminally threaded valve-stem 29 carrying a knurled disk-nut 30. The opposite end part of said stem is centrally alined with the rod 19, spaced therefrom, and coned to extend into a delivery hole or valve-seat 25 in an angle coupling 24 mounted on the lower end of the supply-pipe 18, to thus serve as a needle-valve, controlling the delivery of said pipe 18 through said valve-seat downwardly over the lip projection 26 into the right-hand part of the trough of the hanger-body 7. A knurled annulus 28 is positioned integrally upon said stem at its coned part for a finger hold thereon to be used in turning the stem in the knurled end nut 30. A conical compression spring 33 is mounted on said stem and engaged between said annulus 28 and the hither face of the bushing body 31. The coupling body 24 has a connection 23 with the right-hand end of the central rod 19. The bushing body 31 is held from rotation in the head 17 by means of a setscrew 32. The head 17 is detachably secured to the right-hand flattened and notched termination 10 of the hanger-body 7 by a headed screw 11 traversing the notch 12 and seated in a threaded opening in said head.

The thermostat shown is similar to that shown in my United States Patent No. 1,637,693, dated August 2, 1927, and the elements 15 and 19 thereof are of dissimilar metals having different coefficients of expansion whereby the cylinder 15, having the larger coefficient of expansion, tends when heated to extend longitudinally farther than the inner rod 19, whereby the relations of the needle-valve 27 are changed to the valve-seat 25, allowing more or less liquid to pass the valve-seat about the needle-valve and into the trough 7 to the evaporating pan 4. By turning the knurled annulus 28 together with the valve-stem 29, the latter is moved through the sleeve nut 30, compressing more or less the spring 33 to thus properly position the needle valve in a desired position of adjustment at opposite limits of such adjustment in the automatic controlling of the liquid delivery of the pipe 18.

In the present device, an effective improvement is secured by greater simplicity in said adjusting means, together with the ready mode of disassembling or assembling the valve-stem, the bushing 31, spring 33, which can be manually operated from a casing opening not shown, after the device is installed in a furnace casing 1. The thermostat can also be separated from the hanger-body 7 easily from without the furnace, because of the slippage of the screw 11 from the open end slot or notch 12, when the screw is slightly loosened but not detached from the yoke head 17. When thus disassembled the pan 4 and its overflow pipe 6 may be withdrawn from the furnace casing through said casing opening, not shown. The improved combination of the thermostat with the hanger-body and the evaporating pan, therefore permits greater facility and saving of time in the assemblage or disassemblage of the device.

Having described my invention, what I claim as new, and desire to secure by Letters Patent, is:

1. In humidifying apparatus, the combination with a furnace casing, of an evaporating pan positioned therein, means for delivering a liquid into said pan, and a thermostatic device for controlling the delivery of the liquid, consisting of elements rigidly held at abutting terminations and having differential coefficients of heat expansion, a supporting member fixed on one element having a bearing seat, and resiliently adjustably controlled valvular means mounted removably in said bearing seat, said valvular means being adapted to variably control delivery means for a liquid into said pan by reason of the differential expansion or contraction of said thermostatic elements.

2. In humidifying apparatus, the combination with a furnace casing, of an evaporating pan supported within the casing, a trough delivering into said pan, a thermostatic device comprising a pair of concentric elements fastened together at one end of each and having different coefficients of expansion, a yoke secured on the outer one of said elements having an apertured seat centrally alined with the inner one of the elements, an apertured bushing detachably secured in said seat, a supply-pipe having a valve-seat fixed to the inner element and positioned to deliver into said trough, a needle-valve threaded at one end to be seated in said apertured bushing, a nut mounted on the threaded end of said needle-valve without said yoke to bear against said bushing, the coned termination of said needle-valve extending into said valve-seat to control same under the action of the differential expansions of said thermostatic elements, a finger-hold annulus fixed on said needle-valve, and a coiled compression-spring on said needle-valve engaged between said bushing and said annulus, whereby the valve may be adjusted and resiliently controlled, the needle-valve, spring and bushing being slidably removable from the yoke longitudinally when the bushing is loosened from its securing means.

3. In humidifying apparatus, the combination with a furnace casing, of an evaporating pan positioned therein, means for delivering a liquid into said pan, and a thermostatic device for controlling the delivery of the liquid, consisting of elements rigidly held at abutting terminations and having differential coefficients of heat expansion, a supporting member fixed on one element having a bearing seat, and adjustably controlled valvular means mounted removably in said bearing seat, said valvular means being adapted to variably control delivery means for a liquid into said pan by reason of the differential expansion or contraction of said thermostatic elements.

In testimony whereof I affix my signature.

JAMES W. GALLOWAY.